United States Patent
Li et al.

(10) Patent No.: US 7,880,117 B2
(45) Date of Patent: Feb. 1, 2011

(54) METHOD AND APPARATUS OF DRILLING HIGH DENSITY SUBMICRON CAVITIES USING PARALLEL LASER BEAMS

(75) Inventors: Ming Li, Chelmsford, MA (US); Mitsuhiko Kimoto, Nara (JP)

(73) Assignee: Panasonic Corporation, Osaka (JP)

( * ) Notice: Subject to any disclaimer, the term of this patent is extended or adjusted under 35 U.S.C. 154(b) by 1556 days.

(21) Appl. No.: 10/812,113

(22) Filed: Mar. 29, 2004

(65) Prior Publication Data

US 2004/0188393 A1 Sep. 30, 2004

(51) Int. Cl.
*B23K 26/00* (2006.01)

(52) U.S. Cl. .............. 219/121.7; 219/121.71; 219/121.76; 219/121.78

(58) Field of Classification Search .............. 219/121.7, 219/121.71, 121.76, 121.85, 121.78
See application file for complete search history.

(56) References Cited

U.S. PATENT DOCUMENTS

| | | | |
|---|---|---|---|
| 4,858,240 A | | 8/1989 | Pohler et al. |
| 5,048,034 A | | 9/1991 | Tulip |
| 5,268,919 A | | 12/1993 | Hongu et al. |
| 5,296,673 A | * | 3/1994 | Smith .................... 219/121.68 |
| 5,310,986 A | | 5/1994 | Zumoto et al. |
| 5,417,897 A | * | 5/1995 | Asakawa et al. ............ 264/400 |
| 5,532,873 A | | 7/1996 | Dixon |
| 5,556,395 A | | 9/1996 | Shimmick et al. |
| 5,706,305 A | | 1/1998 | Yamane et al. |
| 5,744,780 A | | 4/1998 | Chang et al. |
| 5,933,218 A | | 8/1999 | Matsubara et al. |
| 5,955,839 A | | 9/1999 | Jaffe et al. |
| 5,973,290 A | * | 10/1999 | Noddin .................... 219/121.7 |
| 6,008,914 A | | 12/1999 | Sasagawa et al. |
| 6,058,127 A | | 5/2000 | Joannopoulos et al. |
| 6,120,976 A | * | 9/2000 | Treadwell et al. ........... 430/322 |
| 6,150,630 A | | 11/2000 | Perry et al. |
| 6,211,485 B1 | * | 4/2001 | Burgess .................... 219/121.7 |
| 6,260,388 B1 | | 7/2001 | Borrelli et al. |

(Continued)

FOREIGN PATENT DOCUMENTS

JP  11-179575  7/1999

(Continued)

OTHER PUBLICATIONS

Statement of Reasons for Rejection and a List of References From a Corresponding Japanese Application No. 2003-21140, Dated Jun. 20, 2007.

*Primary Examiner*—M. Alexandra Elve
(74) *Attorney, Agent, or Firm*—RatnerPrestia (57) ABSTRACT

A method of drilling holes in a work piece includes receiving a laser beam directed along an optical path; and directing the laser beam through a beam former, disposed in the optical path, to form an array of sub-beams of a first pitch size. The method demagnifies the array of sub-beams to form a reduced-size pattern of a second pitch size on the work piece. The array of sub-beams is translated, or moved in a perpendicular direction to the optical path. After translating the array of sub-beams, the method forms the reduced-size pattern of the second pitch size on the work piece. The second pitch size may be smaller than the wavelength of the laser beam.

26 Claims, 7 Drawing Sheets

U.S. PATENT DOCUMENTS

| | | |
|---|---|---|
| 6,433,303 B1 | 8/2002 | Liu et al. |
| 6,433,305 B1 | 8/2002 | Liu et al. |
| 6,574,024 B1 | 6/2003 | Liu |
| 6,888,096 B1 * | 5/2005 | Hamada .................. 219/121.7 |
| 2002/0164678 A1 | 11/2002 | Ganser et al. |

FOREIGN PATENT DOCUMENTS

| | | |
|---|---|---|
| JP | 2000-301372 | 10/2000 |
| JP | 2002-033539 | 1/2002 |

* cited by examiner

METHOD AND APPARATUS OF DRILLING
HIGH DENSITY SUBMICRON CAVITIES
USING PARALLEL LASER BEAMS

TECHNICAL FIELD

The present invention relates, in general, to micromachining using a laser beam. More specifically, the present invention relates to parallel laser micromachining using interpolation to drill high density submicron cavities.

BACKGROUND OF THE INVENTION

As products get smaller, there is greater demand for micro-electrical-mechanical systems (MEMS), micro-optical devices and photonic crystals. With this demand, there is an associated increased interest in micro- and nano-machining. There are many applications for MEMS. As a breakthrough technology, allowing unparalleled synergy between fields such as biology and microelectronics, new MEMS applications have emerged and many more may emerge in the near future, expanding beyond those currently known. Additional applications in quantum electric devices, micro-optical devices and photonic crystals are also emerging.

As an example, photonic crystals represent an artificial form of optical materials that may be used to create optical devices with unique properties. Photonic crystals have optical properties that are analogous to electrical properties of semiconductor crystals and, thus, may allow the development of optical circuitry similar to present electrical semiconductor circuitry. The feature sizes used to form photonic crystals and the precise alignment requirements of these features complicate manufacture of these materials. Improved alignment techniques and reduced minimum feature size capabilities for micromachining systems are still under development. One reason why optical circuits have not been widely implemented is because there are manufacturing problems related to making photonic devices meet index of refraction specifications.

As another example, methods are known for reducing the infrared emissions of an incandescent light source by using an optical microcavity. U.S. Pat. No. 5,955,839, entitled Incandescent Microcavity Light Source having Filament Spaced from Reflector at Node of Wave Emitted, describes microelectronic processing techniques to form a filament in a single optical microcavity. The presence of the optical microcavity provides greater control of the directionality of emissions and increases the emission efficiency in a given bandwidth (for example, the 1-2 micron near infrared band).

A similar type of efficiency gain may be obtained by forming an array of microcavity holes in an incandescent light source. Such a light source may, for example, have microcavities of between 0.5 micron and 10 micron in diameter. While features having these small dimensions may be formed in some materials using standard microelectronic processing techniques, it is difficult to form these features in metals such as tungsten, which is commonly used as an incandescent filament.

Laser light may be used to drill holes in, or otherwise machine a work piece containing glass or silicon or other dielectric material. The behavior of light in such a material may be better understood by analogy to the behavior of electricity in a conventional crystal. Crystals are characterized by a periodic arrangement of atoms or molecules. The lattice of atoms or molecules may introduce gaps in the energy band structure of the crystal through which electrons cannot propagate. A photonic crystal is a lattice of discontinuities in the refractive index of a material. One example is a lattice of holes in a waveguide. If the dielectric constants of the waveguide material and the material in the holes are sufficiently different, light is substantially confined by these interfaces. Scattering of the light at these interfaces can produce many of the same effects for photons as effects produced for electrons by the lattice of atoms or molecules.

Typically, ultrafast lasers in the visible (dye laser) or IR range (the fundamental wavelength of Ti: Sapphire or Nd:YLF) have been used for laser machining applications. It is known that the minimum spot size of a focused laser beam, having a Gaussian beam profile, is approximately 2.44 times the f# of the objective lens, times the peak wavelength of the laser, i.e. the spot size is proportional to the peak wavelength. Thus, in a system where a visible or an IR laser is used for nanomachining, the spot size is undesirably large for forming submicron features, even if high numerical aperture (low f#) optics are used. For example, if a Ti: Sapphire laser having an 800 nm peak wavelength and optics with an f# of 1 at 800 nm are used, the minimum size beam spot has a diameter of 1952 nm.

Even with this disadvantage, in late 1999 and early 2000, a frequency doubled Ti: Sapphire laser with a peak wavelength of 387 nm has been used to machine approximately 200 nm air holes in plain Si-on-$SiO_2$ substrate. This submicron feature was achieved by controlling the fluence of a laser beam spot so that ablation only occurs near the intensity peak of the laser beam spot. This technique, however, has a number of drawbacks for precise nanomachining, since a center of the area actually machined may be somewhat offset from a center of the intensity profile. This uncertainty of the machining center may be induced by defects or imperfections of the material being processed, or may be due to slight pulse-to-pulse variations in the beam profile. In addition, as the feature sizes on the substrate decrease to less than or equal to the size of the wavelength of the beam, the image formed on the substrate is blurred.

Furthermore, it is difficult to accurately align a laser beam to produce multiple holes positioned in a desired lattice arrangement with an accuracy needed for an effective photonic structure. A current method of producing holes (single and multiple holes) uses a moveable work piece holder on which a photonic crystal is mounted. The laser beam is aligned at a desired location on the crystal by maintaining the laser beam in a single location and moving the work piece holder with the work piece mounted onto it. The holder, however, cannot be moved with a level of accuracy suitable for manufacturing photonic crystals.

What is needed is a better way to mass manufacture a photonic crystal including a way to drill submicron holes or cavities in a substrate where the feature size is less than or equal to the wavelength of the laser beam, and accomplish the drilling simultaneously using parallel beams of light. The present invention addresses such need. What is also needed is a better way of making an array of microcavities in an incandescent light source, such as a filament made from tungsten. The present invention also addresses this need.

SUMMARY OF THE INVENTION

To meet this and other needs, and in view of its purposes, the present invention provides a laser micromachining system for drilling holes in a work piece. The system includes a laser beam generator for directing a laser beam having a wavelength $\lambda$, along an optical path, and an image interpolating mask having an array of apertures, disposed in the optical path, for receiving the laser beam and forming a corresponding array of sub-beams of a first pitch size. A demagnifier is disposed in the optical path, for forming a reduced-size pattern of the array of sub-beams on the work piece. The reduced-size pattern has a second pitch size. The second pitch size may be less than A and the first pitch size may be greater than $\lambda$. When the laser beam is generated, the image interpolating mask is effective in forming an array of holes having the second pitch size. The array of sub-beams formed by the image interpolating mask is a sub-pattern of the reduced-size pattern formed on the work piece, and the array of sub-beams is configured for translation in a perpendicular direction to the optical path and for sequentially forming the reduced-size pattern on the work piece.

The laser micromachining system may have an array of apertures in the image interpolating mask with an aperture density of 1/N times an image density of the reduced-size pattern on the work piece and times a demagnification factor of the demagnifier, N being a positive integer, and the array of sub-beams is configured to translate N-times in a perpendicular direction to the optical path by a translation controller to form the array of holes of the second pitch size. The second pitch size is less than a diffraction limit of the laser beam, and the first pitch size is greater than the diffraction limit of the laser beam multiplied by a demagnification factor of the demagnifier.

Another embodiment of the invention is a laser micromachining system for drilling holes in a work piece. The system includes a laser beam generator for directing a laser beam along an optical path where the laser beam has a wavelength of $\lambda$. A diffraction optical element (DOE) and a telecentric f-$\theta$ lens are disposed in the optical path for receiving the laser beam and forming an array of sub-beams, where the array of sub-beams has a first pitch size. A demagnifier forms a reduced-size pattern of the sub-beams onto the work piece, where the reduced-size pattern has a second pitch size. The second pitch size may be less than $\lambda$ and the first pitch size may be greater than $\lambda$. When the laser beam is generated, the DOE and the telecentric f-$\theta$ lens are effective in forming an array of holes having the second pitch size. The array of sub-beams formed by the DOE and the telecentric f-$\theta$ lens are a sub-pattern of the reduced-size pattern formed on the work piece, and the array of sub-beams is configured for translation in a perpendicular direction to the optical path and for sequentially forming the reduced-size pattern on the work piece. The second pitch size is less than a diffraction limit of the laser beam, and the first pitch size is greater than the diffraction limit of the laser beam multiplied by a demagnification factor of the demagnifier.

Another embodiment of the invention is a method of drilling holes in a work piece. The method includes the steps of: (a) receiving a laser beam directed along an optical path; (b) directing the laser beam through a beam former, disposed in the optical path, to form an array of sub-beams of a first pitch size; (c) demagnifying the array of sub-beams to form a reduced-size pattern of a second pitch size on the work piece; (d) translating the array of sub-beams in a perpendicular direction to the optical path; and (e) after translating the array of sub-beams in the perpendicular direction to the optical path, forming the reduced-size pattern of the second pitch size on the work piece.

The method may include receiving the laser beam having a wavelength of $\lambda$; and forming the array of sub-beams with a pitch size greater than the wavelength of $\lambda$. The method may form the reduced-size pattern on the work piece with a pitch size smaller than the wavelength of $\lambda$.

The method may include directing the laser beam through an image interpolating mask having an array of apertures, and forming the array of sub-beams after passing the laser beam through the array of apertures. The method may also include directing the laser beam through a DOE and a telecentric f-$\theta$ lens, and forming the array of sub-beams after passing the laser beam through the DOE and the telecentric f-$\theta$ lens.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

Figure 1:
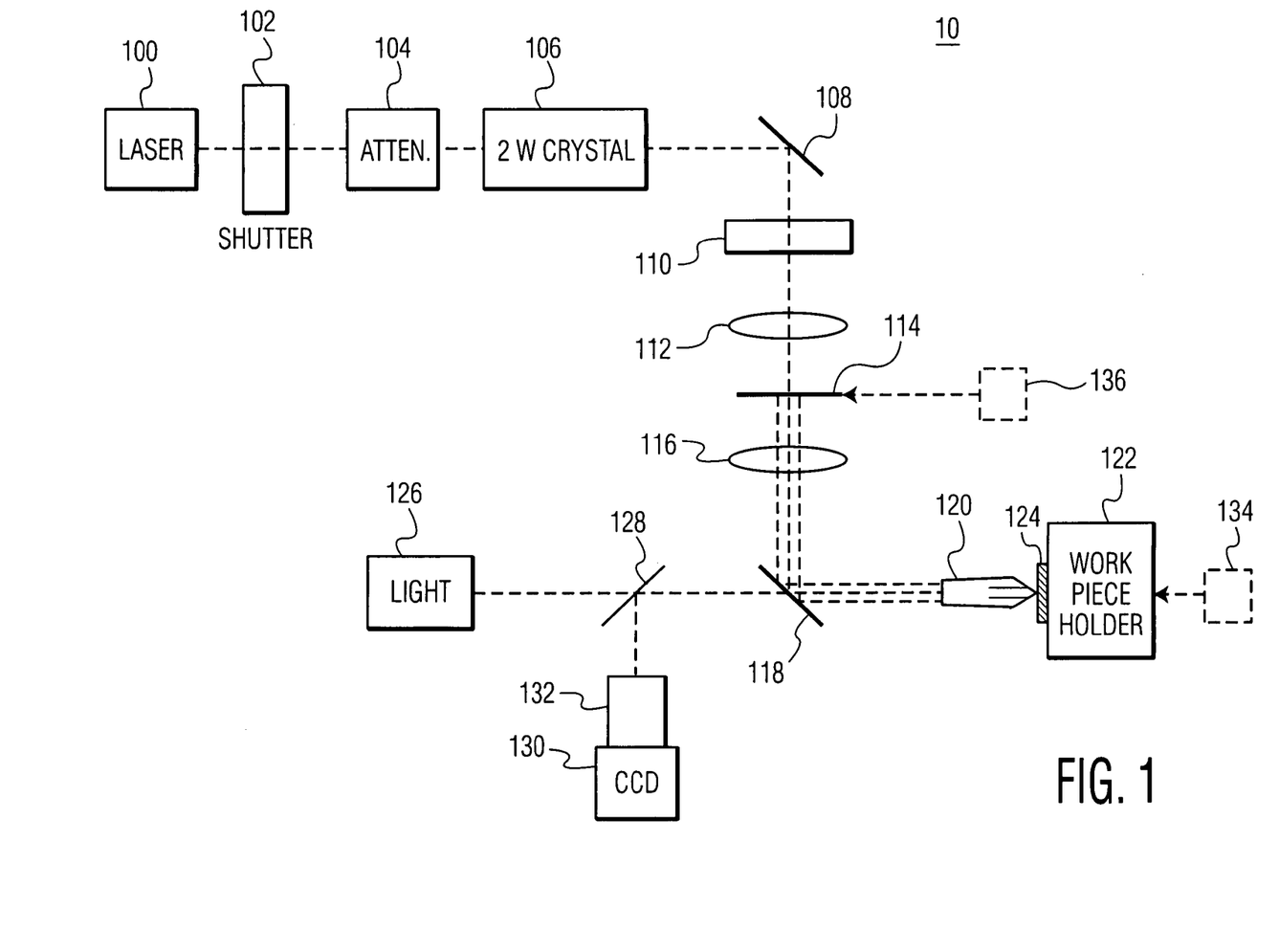
FIG. 1 is a block diagram of an exemplary laser micromachining system, according to an embodiment of the present invention.

FIG. 1. illustrates a simplified block diagram of an exemplary laser micromachining system according to the present invention, generally designated by 10. This exemplary system includes: ultrafast laser oscillator 100; shutter 102; variable attenuator 104; harmonic generating crystal 106; dichroic mirrors 108 and 118; polarization converter 110; lenses 112 and 116; imaging mask 114; microscope objective 120; work piece holder 122; work piece 124; work piece illumination source 126; beam splitter 128; and digital camera 130. The optical beams in the exemplary system are shown as dashed or dotted lines.

In this exemplary system, ultrafast laser oscillator 100 may be any type of gain medium typically used for ultrafast laser machining applications, such as: Cr:YAG (peak fundamental wavelength, $\lambda_f$=1520 nm); Cr:Forsterite ($\lambda_f$=1230-1270 nm); Nd:YAG and Nd:YVO$_4$ ($\lambda_f$=1064 nm); Nd:GdVO$_4$ ($\lambda_f$=1063 nm); Nd:YLF ($\lambda_f$=1047 nm); Nd:glass ($\lambda_f$=1047-1087 nm); Yb:YAG ($\lambda_f$=1030 nm); Cr:LiSAF ($\lambda_f$=826-876 nm); Ti:Sapphire ($\lambda_f$=760-820 nm); and Pr:YLF ($\lambda_f$=612 nm). This element also includes optics to substantially collimate the laser light. Ultrafast laser oscillator 100 may produce nearly Fourier-transform limited pulses having a duration of less than about 1 ps, typically approximately 150 fs ($150 \times 10^{-15}$ sec.). Shutter 102 may be used to control the laser output (i.e. open during machining or drilling and closed to block the beam when not machining or drilling). This may extend the life of other components in the exemplary micromachining system.

Variable attenuator 104 allows for fine control of the pulse energy, and thus the beam fluence. Variable attenuator 104 may be any type of variable attenuator that can withstand the high peak power associated with ultrafast lasers. For example, the attenuator may be a pair of linear polarizing members arranged on either side of a controllable polarization rotation element, such as a Pockels cell, Kerr cell, or a liquid crystal. Alternatively, a fixed linear polarizing member and a rotatable polarization member may be used as variable attenuator 104. The resulting control of the pulse energy is especially critical for machining features that are smaller than a minimum spot size of light of a particular wavelength. As will be explained, the present invention may micromachine fine features which are even smaller than the diffraction limited size of the beam spot.

The attenuated beam then enters harmonic generating crystal 106. This crystal may be designed to double, triple, or quadruple the fundamental frequency of the laser pulses generated by ultrafast laser oscillator 100. As an example, when laser oscillator 100 has a wavelength of 775 nm, the harmonic generating crystal may have an emitted beam of 387.5 nm. In another embodiment of the invention, harmonic generating crystal 106 may be omitted.

The efficiency of harmonic generating crystal 106 may vary with the intensity of the fundamental light incident on the crystal. Thus, selection of an attenuation, through variable attenuator 104, affects this efficiency. Harmonic generating crystal 106 may be optimized for a particular input fundamental wavelength and harmonic number. Although it may be possible to tune the peak wavelength of ultrafast laser oscillator 100 over a wide range, such tuning may not be desirable for harmonic generation.

Continuing the description of FIG. 1, both mirror 108 and mirror 118 are dichroic mirrors designed to have a high reflectivity (typically >95%) throughout the bandwidth of the laser pulses. The mirrors may desirably have minimal absorption at the fundamental wavelength of ultrafast laser oscillator 100 and at all of the harmonics that may be generated by harmonic generating crystal 106.

This pair of dichroic mirrors, 108 and 118, allows steering of the laser beam and helps prevent unwanted light emitted from harmonic generating crystal 106 (at a fundamental wavelength, or a lower harmonic wavelength than that desired) from reaching the target area on work piece 124. Dichroic mirror 118 also desirably allows the visible light from work piece illumination source 126 to be efficiently transmitted for illuminating and imaging work piece 124.

Polarization converter 110 desirably transforms the polarization of the laser pulses to circular polarization. It will be appreciated that circularly polarized light produces minimum sized and consistently round holes on work piece 124. The laser pulses incident on polarization converter 110 may be linearly polarized, in which case polarization converter 110 may be a quarter-wave plate optimized for the peak wavelength of the laser pulses. This is particularly likely if variable attenuator 104 is a polarization based attenuator. If the laser pulses incident on polarization converter 110 have not been polarized, polarization converter 110 may include a linear polarizing member followed by a quarter wave plate.

The nearly circularly polarized laser pulses may be focused by lens 112 behind imaging mask 114 into a narrower beam. Lens 116 then re-collimates the laser pulses. Lenses 112 and 116 are desirably of low absorptivity and low chromatic aberration within the bandwidth of the laser pulses.

As will be discussed, imaging mask 114 of the present invention includes multiple apertures or pinholes and, therefore, emits multiple laser beams toward lens 116. The number of multiple beams that are emitted may correspond to the number of apertures in imaging mask 114. It will be appreciated to one skilled in the art that the multiple beams formed by the corresponding multiple apertures are not spatially separated. These multiple beams cannot be seen individually as they travel toward work piece 124. These multiple beams, however, form individual image spots on the surface of work piece 124.

In an embodiment of the invention, lens 116 may have a focal length of 100 mm and may be placed approximately 100 mm from imaging mask 114 and approximately 100 mm from mirror 118.

The multiple laser beams are then directed by dichroic mirror 118 into microscope objective 120, which focuses the beams onto a target area on the surface of work piece 124 that is held in place by work piece holder 122. The microscope objective desirably also has low absorptivity and low chromatic aberration within the bandwidth of the laser pulses.

In an embodiment of the invention, microscope objective 120 may be a near ultra-violet (NUV) 20× objective with a focal length of 10 mm. In this exemplary embodiment, the combination of lens 116 and microscope objective 120 results in a demagnification factor of 100:10 (10 times) upon work piece 124. Thus, the size of the image formed by imaging mask 114 on the work piece is $\frac{1}{10}^{th}$ the size of the image at imaging mask 114. This demagnification also implies that the image formed on the work piece is moved $\frac{1}{10}^{th}$ of the distance that imaging mask 114 is moved. As an example, when imaging mask 114 is moved 1 mm, the image on the work piece moves 100 microns (1 mm/10=100 microns).

Work piece holder 122 may include a computer-controlled XYZ motion stage with micrometer resolution (for example, a micron resolution XYZ motion stage manufactured by Burleigh). A computer-controlled, piezo-electric XY motion stage with nanometer-resolution (for example, a piezo-electric XY motion stage manufactured by Queensgate) may also be included. Focusing of the laser pulses may be achieved by moving or translating work piece 124 nearer to, or farther from, microscope objective 120 using motion stage 134 (shown in dashed lines). Both motion stages may be used to align the beams on the surface of work piece 124, with the micrometer resolution XYZ motion stage providing coarse positioning (translation) and the piezo-electric motion stage providing fine positioning (translation).

Alternatively, a computer-controlled, piezo-electric XY motion stage with nanometer-resolution coupled to imaging mask 114 may be used for fine alignment of the beams on work piece 124. Such computer controlled motion stage is shown in dashed lines and is designated as 136.

With a 10:1 ratio of demagnification (for example) and using a computer-controlled, piezo-electric XY motion stage with nanometer-resolution to move the imaging mask, the positioning of the multiple beams on the work piece may be controlled with better precision.

To monitor the alignment of the multiple laser beams on the work piece, and the progress of the drilling, the surface of work piece 124 may be illuminated by work piece illumination source 126 and imaged by digital camera 130 (for example, a Roper Scientific digital camera, having a matrix of 1300×1030 pixels, with a pixel length and width of approximately 6.7 µm). The imaging light from work piece illumination source 126 may be collimated by an included lens system (not separately shown) and then passed through beam splitter 128 (for example, a half silvered mirror) and dichroic mirror 118. The imaging light follows the path of the laser beams and is focused onto work piece 124 by microscope objective 120. The imaging light is then reflected back through this objective. The imaging light passes back through dichroic mirror 118 and is reflected off beam splitter 128 into digital camera 130. The digital camera forms an image of the work piece surface.

To reduce potential chromatic aberrations of this image, the imaging light desirably has a narrow spectrum. Although it may be desirable for work piece illumination source 126 to be a light emitting diode or a diode laser, a filtered broad spectrum light source may also be used. Although the use of dichroic mirror 118 to combine the laser beams and the imaging light beam requires that these light beams have different wavelengths, it may be desirable for the two light sources to have similar wavelengths so that microscope objective 120 may focus both beams similarly. Any difference between the focal lengths of the microscope objective at the illumination wavelength and the laser wavelength of the laser beams may be compensated by the optics of digital camera.

Additional optics between beam splitter 128 and digital camera 130 may optionally be used. For example, lens 132 may be inserted between digital camera 130 and beam splitter 128. If used, lens 132 may have a focal length of 300 mm to 500 mm. This provides the camera a 30 to 50 times enlargement of the image scanned on the work piece.

Figure 2:
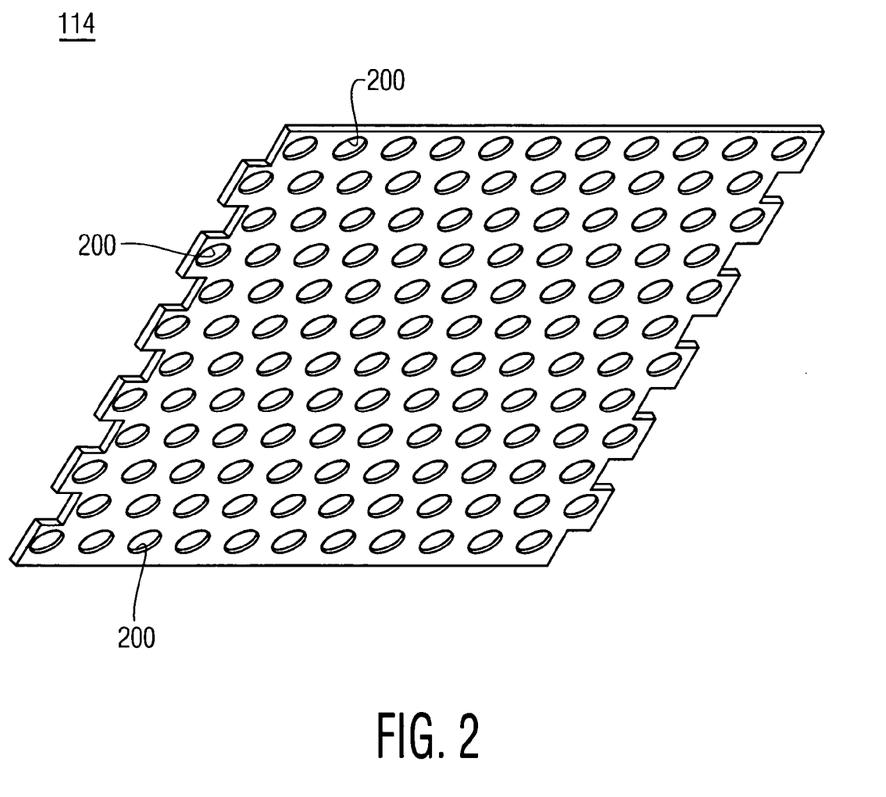
FIG. 2 is an illustration of an imaging mask disposed in the optical path of the system shown in FIG. 1, in accordance with an embodiment of the invention.

Imaging mask 114, shown enlarged in FIG. 2, is formed according to the present invention, to provide a drilling pattern to ablate work piece 124 of FIG. 1. As shown, imaging mask 114 includes a plurality of pinholes or apertures 200. The imaging mask effectively masks out much of the energy of the laser beam emitted from polarization converter 110 (FIG. 1), and creates a plurality of sub-beams impinging upon work piece 124.

In the exemplary embodiment approximately 130 pinholes are shown. More typically, however, there may be as many as 6000 pinholes in imaging mask 114. The multiple pinholes are placed in the path of the laser beam entering on the input side of imaging mask 114 and are effective in producing multiple sub-beams at the output path of the imaging mask.

Figure 3:
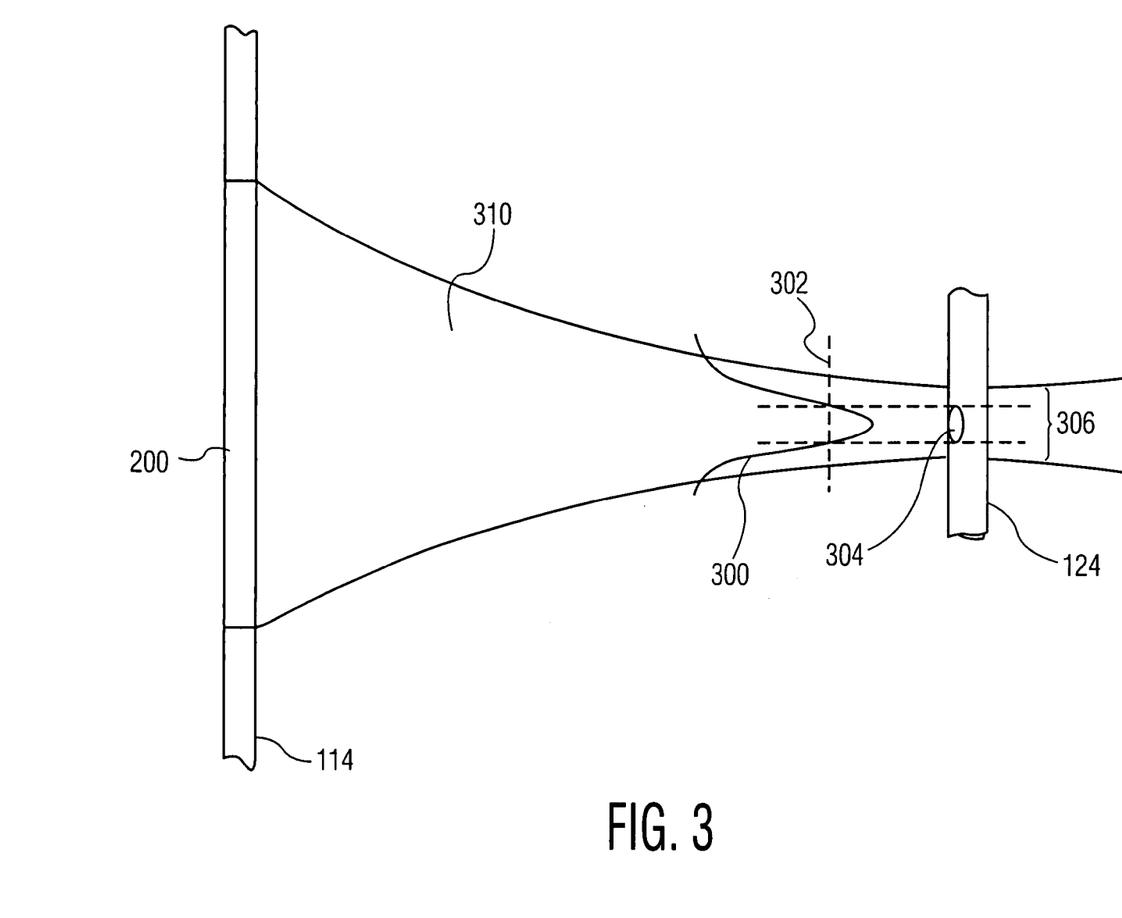
FIG. 3 illustrates a relationship between a sub-beam formed by a single aperture on the imaging mask of FIG. 2 and a corresponding hole drilled by that sub-beam on a work piece, in accordance with an embodiment of the invention.

FIG. 3 illustrates a relationship between a sub-beam formed by one aperture on the imaging mask and a corresponding hole drilled by the same sub-beam on the work piece. The sub-beam is generally designated as 310 and is shown being emitted from pinhole 200 of imaging mask 114. It will be understood that the dimensions shown in FIG. 3 are not to scale, as it will be recalled that the exemplary embodiment shown in FIG. 1 includes a 10:1 demagnification between the diameter of the beam at imaging mask 114 and the diameter of the beam impinging upon work piece 124. Lens 116, mirror 118 and microscope objective 120 shown in FIG. 1 have been omitted for purposes of discussion.

In the exemplary illustration of FIG. 3, the laser beam is focused into diffraction limited beam spot 306 on the top surface of work piece 124 by the exemplary laser micromachining system. Gaussian curve 300 represents the radial fluence of the laser sub-beam on the surface. Line 302 is an exemplary machining threshold of the device material. Depending on the peak fluence of the laser sub-beam, line 302 may fall above, below, or exactly at the full width at half maximum (FWHM) of Gaussian curve 300. The horizontal lines extending from the intersections of Gaussian curve 300 and line 302 define area 304 on the surface of work piece 124. Therefore, area 304 is the portion of the surface to be machined directly by laser sub-beam 310. Additional material may be machined due to conduction of thermal energy within the device material, but, in laser machining with ultrafast lasers, creation of such a heat affected zone in the material is minimized. Thus, by accurately controlling the peak fluence with variable attenuator 104, the size of area 304 may be carefully controlled, allowing the machining of fine features smaller than the diffraction limited spot size of the ultrafast laser.

As may be seen from FIG. 3, the smaller the desired diameter of area 304 relative to the diameter of diffraction limited beam spot 306 becomes, the shallower the slope of the beam fluence profile at the machining threshold becomes. A shallower slope means that a small variation in the peak fluence of the beam spot between pulses may lead to an undesirably large uncertainty in machined area 304. Also, machining in a portion of the beam spot in which Gaussian curve 300 has a shallow slope may increase the heat affected zone surrounding machined area 304. Ideally, the edges of machined area 304 may fall near the steepest portion of the slope of Gaussian curve 300, when the diameter of machined area 304 is approximately 0.72 of the FWHM of Gaussian curve 300. Thus, it is desirable to move toward the use of shorter wavelength ultrafast lasers for machining of smaller features.

The inventors discovered that parallel laser micromachining or drilling may be achieved with the imaging mask of FIG. 2. When using an ultrafast laser, as described with respect to FIG. 1, submicron features on a work piece may be machined in parallel.

Figure 4:
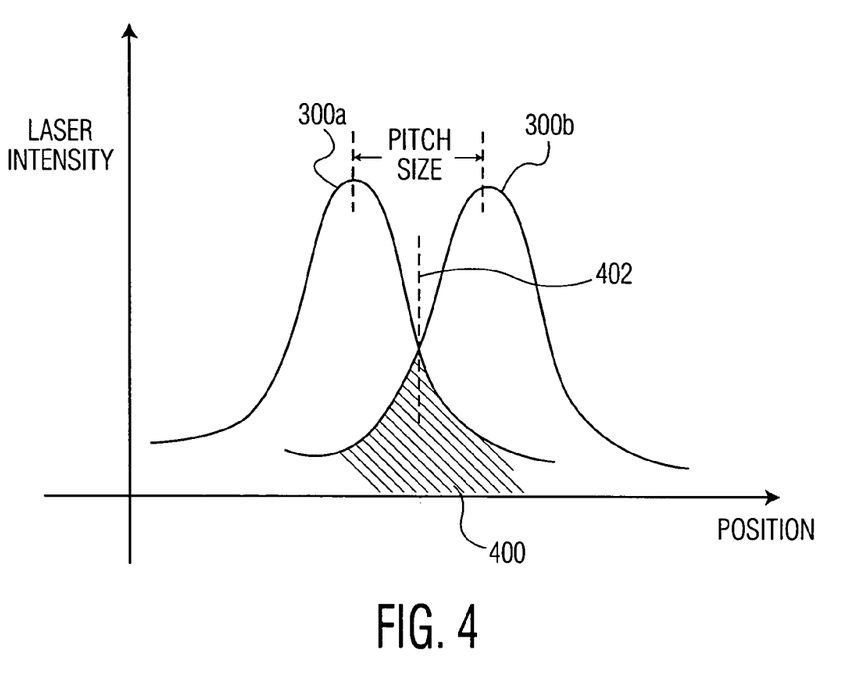
FIG. 4 is an illustration of the intensity distributions of two adjacent sub-beams as they interfere with each other in an overlapping region, in accordance with an embodiment of the invention.

There is a factor, however, that limits the minimum distance between two nearest features (pitch size) being drilled simultaneously. This limiting factor is the diffraction limit. The diffraction limit is close to the wavelength of the laser sub-beams used for drilling. As shown in FIG. 4, two adjacent sub-beams have similar Gaussian intensity distributions, designated as 300a and 300b. As the pitch size approaches the diffraction limit, the two sub-beams begin to interfere with each other.

As shown in FIG. 4, there is no clear separation between the two adjacent sub-beams. As they interfere with each other, undesired results are produced in the region designated as 400. In region 400, the two adjacent sub-beams may constructively interfere with each other to produce an increased laser intensity at center line 402. Generally, when the pitch size is approximately similar to the wavelength of the laser sub-beams, the laser sub-beams interfere with each other. This presents a problem, when high density submicron holes are drilled in parallel.

Figure 5:
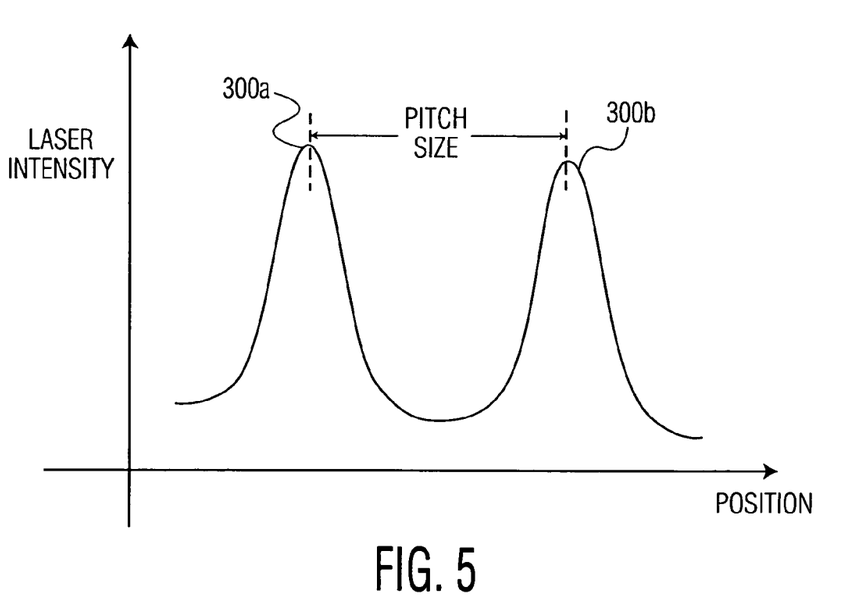
FIG. 5 is an illustration of the intensity distributions of two adjacent sub-beams, which are sufficiently separated so that they do not interfere with each other, in accordance with an embodiment of the invention.

The inventors discovered, however, that when the pitch size is greater than the wavelength of the laser sub-beams, the sub-beams may not interfere with each other during parallel drilling or machining. In addition, the inventors discovered that the bigger the pitch size of the laser sub-beams, the less the likelihood that the sub-beams may interfere with each other. A condition where the sub-beams do not interfere with each other is shown in FIG. 5. As shown, the pitch size is such that the Gaussian intensity distributions of two adjacent sub-beams 300a and 300b do not interfere with each other.

As an example, if the laser beam produced by laser oscillator 100 is 775 nm and if harmonic generating crystal 106 is used, then imaging mask 114 may form multiple sub-beams, each having a wavelength of 387.5 nm. The energies of the multiple sub-beams may be used to simultaneously drill multiple holes in work piece 124 (FIG. 1). If the pitch size of the pinholes in imaging mask 114 produces an image (demagnified 10:1, for example) on work piece 124 having sub-beam intensities separated by a pitch size greater than 387.5 nm, then no interference may be produced by the sub-beams. The imaging mask may be used to simultaneously drill holes with the pitch size of the sub-beams as shown in FIG. 5.

If, however, it is desired to simultaneously drill multiple holes with a pitch size of less than 387.5 nm (for example), then to prevent sub-beam interference, an interpolating imaging mask may be used, as described below.

Figure 6:
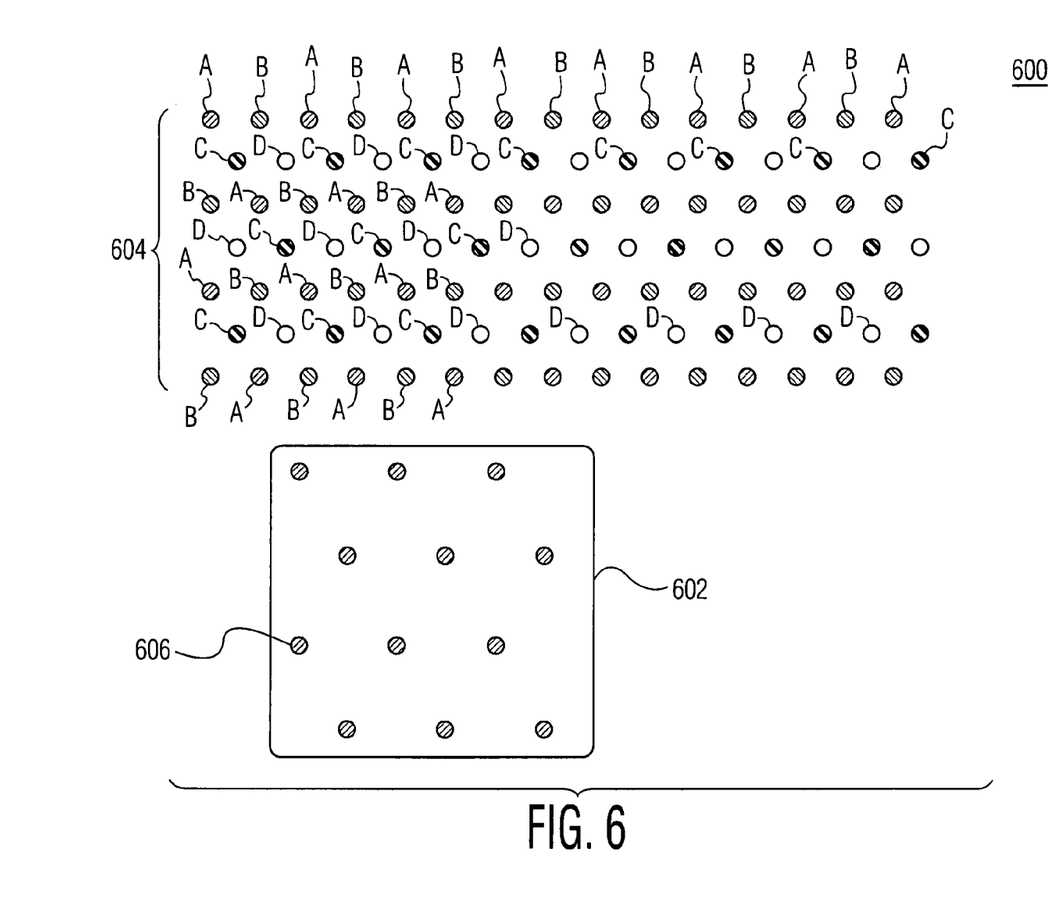
FIG. 6 illustrates a partial interpolating image mask configured with ¼ of the density of an image dot pattern, in accordance with an embodiment of the invention.

In accordance with the present invention, a partial interpolating image mask, generally designated as 602, is shown in FIG. 6. Interpolating mask 602 is configured, for example, to have ¼ the density of pattern 604, or twice the pitch size of pattern 604. In the exemplary embodiment of FIG. 6, it is desired to drill holes having a pattern similar to pattern 604.

As a result, interpolating mask 602 may be inserted, as a method of the invention, into micromachining system 10 instead of imaging mask 114. Interpolating mask 602 may be used more than once to form overlapping images on the work piece. As an example, image pattern 604 may be constructed by moving interpolating mask 602 four times. In a first move (or run), the array of holes 606 is moved to line up with the array of dots designated as "A". A first set of holes may then be drilled corresponding to the array of dots "A". In a second run, the array of holes 606 is moved to line up with the array of dots designated as "B". A second set of holes may then be drilled corresponding to the array of dots "B". In a third run, the array of holes 606 is moved to line up with the array of dots designated as "C". A third set of holes may then be drilled corresponding to the array of dots "C". In a fourth run, the array of holes 606 is moved to line up with the array of dots designated as "D". A fourth set of holes may then be drilled corresponding to the array of dots "D".

It will be appreciated that although FIG. 6 shows round holes, other shapes of holes may be drilled by the embodiment shown in FIG. 6 and by all the embodiments of the invention. In addition, the work piece, for example, may be any material requiring an array of submicron cavities, such as a tungsten filament or a photonic crystal.

Using an interpolation mask, as shown, for example, in FIG. 6, the holes on the work piece may have a relationship to each other that depends on the Rayleigh distance. A minimum distinguishable distance between two Gaussian beams depends on the following relationship:

Rayleigh distance=$0.61*\lambda/N.A.$ where $\lambda$ is the wavelength and N.A. is the numerical aperture of the focusing lens.

In the exemplary embodiment of the invention, $\lambda$ is 387.5 nm, and N. A. of the lens is 0.4. Therefore, the Rayleigh distance is 591 nm.

This is effectively the minimum distance that may be required to distinguish two Gaussian beams. If the distance is less than the Rayleigh distance, the beams may appear like one beam. Practically, however, the inventors discovered that even if the two beams are separated by the Rayleigh distance (and are distinguishable), there may still be some overlap between the beams. This in turn may introduce interference. In order to reduce this overlap, the pitch size may desirably be no smaller than approximately 1.5* the Rayleigh distance.

In the exemplary embodiment of the invention, the pitch size may desirably be 1.5*591 nm=886 nm. This may be the minimum pitch size without significant interference.

During experimentation, the inventors achieved different relationships among the imaging mask, the image formed on the work piece, and the ablated hole size of the work piece. For example, with a 10:1 demagnification, the following result has been achieved:

|  | On the Mask | Image on workpiece | Ablated hole size |
|---|---|---|---|
| Feature size | 10 micron | 1 micron (spot size) | 700 nm |
| Pitch size | 15 micron | 1.5 micron | 1500 nm |

In the above example, the pitch size of the holes on the work piece is 1500 nm, which is greater than 886 nm. There is no problem with interference.

As another example, with a 20:1 demagnification, the following result has been achieved:

|  | On the Mask | Image on workpiece | Ablated hole size |
|---|---|---|---|
| Feature size | 10 micron | 0.5 micron (spot size) | 400 nm |
| Pitch size | 15 micron | 0.75 micron | 750 nm |

In this example, shown above, the pitch size on the work piece is 750 nm, which is less than 886 nm. The 15 micron pitch on the mask is too small. The inventors noticed interference in this case.

In yet another experiment, with a 20:1 demagnification, the following result has been achieved:

|  | On the Mask | Image on workpiece | Ablated hole size |
|---|---|---|---|
| Feature size | 10 micron | 0.5 micron (spot size) | 400 nm |
| Pitch size | 30 micron | 1.5 micron | 1500 nm |

With a 30 micron pitch size on the imaging mask, the pitch size on the work piece is 1500 nm, and no interference is produced. Interpolation, of course, needs to be used in this case.

It will be understood that other patterns may also be simultaneously drilled by using an interpolation imaging mask. Most periodic structures, such as those exemplified in FIG. 2, may be broken down into "n" subgroups. For the example shown in FIG. 6, the feature density in the image plane is dropped by a factor of 4. As a result, the pitch size increases by a factor of 2. During laser ablation, ¼ of the holes are first machined in parallel. The remaining ¾ of the holes may be drilled in 3 separate exposures by using interpolation.

Figure 7:
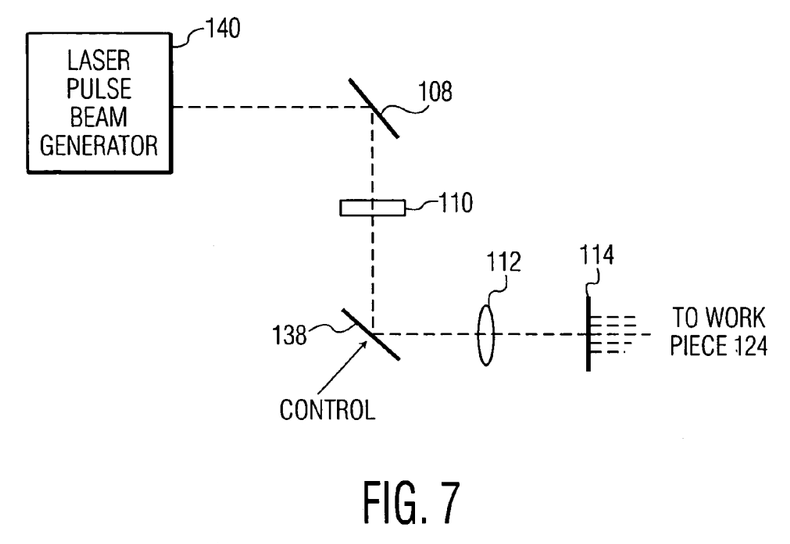
FIG. 7 is a block diagram of another embodiment of the invention.

Referring next to FIG. 7, there is shown an embodiment similar to FIG. 1. Laser pulse beam generator 140 may include ultrafast laser oscillator 100, shutter 102, variable attenuator 104 and harmonic generating crystal 106. Mirror 108, polarization converter 110, lens 112 and imaging mask 114 (also referred to herein as a beam former) are also included. The remaining components between imaging mask 114 and work piece 124 have been omitted. The embodiment of FIG. 7 also includes scanning mirror 138.

Scanning mirror 138 is effective in forming a uniformly distributed laser beam impinging onto imaging mask 114. The scanning mirror assures that the laser beam has a cross-sectional diameter that is sufficiently large to be in the path of the multiple apertures of imaging mask 114. In this manner, the multiple apertures provide output sub-beams with Gaussian intensity distributions that are substantially equal to each other.

Figure 8:
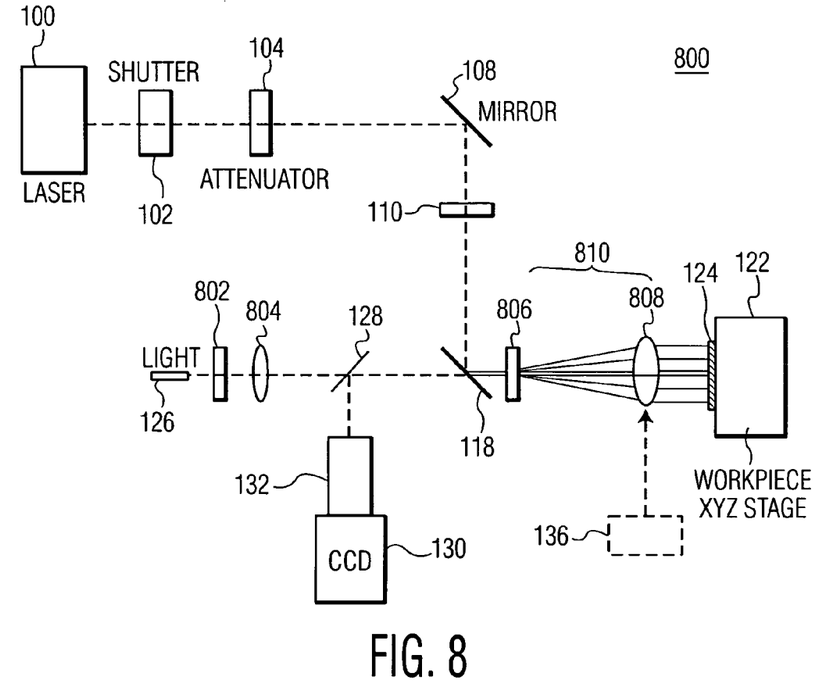
FIG. 8 is a blocked diagram of yet another embodiment of the present invention.
Figure 9:
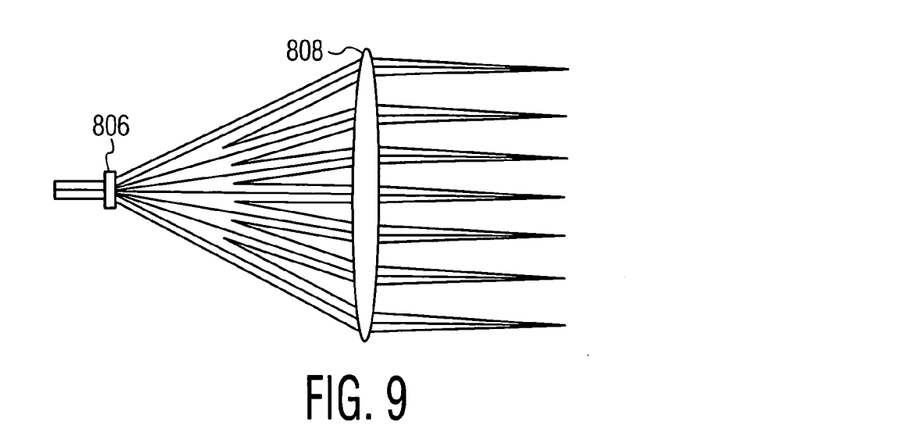
FIG. 9 is an exemplary embodiment of a phase mask disposed in the optical path of the system shown in FIG. 8.

Another embodiment of the invention is shown in FIGS. 8 and 9, and is generally designated as 800. This exemplary embodiment includes: ultrafast laser oscillator 100; shutter 102; variable attenuator 104; dichroic mirrors 108 and 118; polarization converter 110; diffraction optical element (DOE) 806; telecentric f-θ lens 808; work piece 124; work piece holder and translation stage 122; work piece illumination source 126; polarizer 802; lens 804; beam splitter 128; and CCD camera 130. The optical beams in the exemplary embodiment are shown as dashed or dotted lines.

A major difference between the embodiment of FIG. 1 and the embodiment of FIG. 8 is that the former includes imaging mask 114 and the latter includes a phase mask of DOE 806 and telecentric f-θ lens 808. The phase mask is designated as 810. DOE 806 is an optical component that changes the phases of an optical beam to achieve a desired diffracted beam pattern. DOE 806 may include fresnel lenses, gratings and computer generated (phase-only) holograms. A DOE may also include a periodic phase changing component, in which the surface relief profile of the DOE changes the phase of light passing through the DOE. This type of DOE is known as a Kinoform or simply a grating.

As best shown in FIG. 9, DOE 806 may be used as a beam splitter or a spot-array generator, or as a fan-out element. The output beams of the DOE are duplicates of the incident beam propagating from ultrafast laser oscillator 100. Each output beam, however, propagates in a different direction. With the addition of telecentric f-θ lens 808, the angle beam pattern is transformed into a parallel beam pattern, which may be focused in several planes to produce an array of sub-beams similar to the array of sub-beams formed by imaging mask 114. As with the array of sub-beams formed using imaging mask 114, it is desirable for the array of sub-beams formed using DOE 806 and telecentric f-θ lens 808 to have a density of 1/N times the image density of the reduced-size pattern to be machined on work piece 124, times the demagnigication factor of the demagnifier. The array of sub-beams is configured to translate N-times in a perpendicular direction to the optical path by a translation controller to form the array of holes of the second pitch size in workpiece 124. The second pitch size is less than the diffraction limit of the laser beam, and the first pitch size is greater than the diffraction limit of the laser beam multiplied by a demagnification factor of the demagnifier.

It will be appreciated that a harmonic generating crystal (106 in FIG. 1) may be included in the optical path of micromachining system 800, in order to double the frequency of the laser beam emitted from ultrafast laser oscillator 100. In addition, microscope objective 120 (FIG. 1) may be included in the optical path, in order to produce a demagnification factor of 10, for example, upon work piece 124.

It will also be appreciated that telecentric f-θ lens 808 may be translated in a direction perpendicular to the optical path by a translation or motion stage (not shown). The DOE, however, requires that it not be moved. Alternatively, work piece 124 may be translated or moved in a direction perpendicular to the optical path by an XYZ stage, as shown in FIG. 8.

The array of sub-beams emitted by phase mask 810 may have Gaussian intensity distributions similar to those shown in FIG. 3. Each sub-beam may be effective in drilling a hole in work piece 124, which may fall above, below, or exactly at the FWHM of the Gaussian intensity distribution. If the array of sub-beams have a pitch size greater than the wavelength λ of the pulsed laser beam impinging on the phase mask, then the sub-beams may not interfere with each other. As discussed previously, the inventors discovered that the bigger the pitch size of the laser sub-beams, the less the likelihood that the sub-beams may interfere with each other. Parallel drilling of holes may be performed in a single run, assuming no demagnification between the phase mask and the work piece. The density and pitch size of the sub-beams may equal the density and pitch size of the array of drilled holes.

If the desired pattern of drilled holes on the work piece, however, has a pitch size of less than the laser wavelength impinging upon phase mask 810, then an interpolating phase mask may be formed. The interpolating phase mask may be constructed to output a sub-set pattern of the image pattern formed on the work piece. The sub-set pattern may then form an array of sub-beams which do not interfere with each other, as shown in FIG. 5. Parallel drilling of holes may be performed using multiple runs. For example, assuming no demagnification, the interpolating phase mask may be constructed to output an array of sub-beams having ¼ the density, or twice the pitch size, of the desired density, or pitch size, of the drilled holes. During laser ablation, ¼ of the holes may be first drilled in parallel (one run). The remaining ¾ of the holes may be drilled in 3 separate exposures (3 additional runs) by using interpolation, as previously described with respect to FIG. 6.

Figure 10:
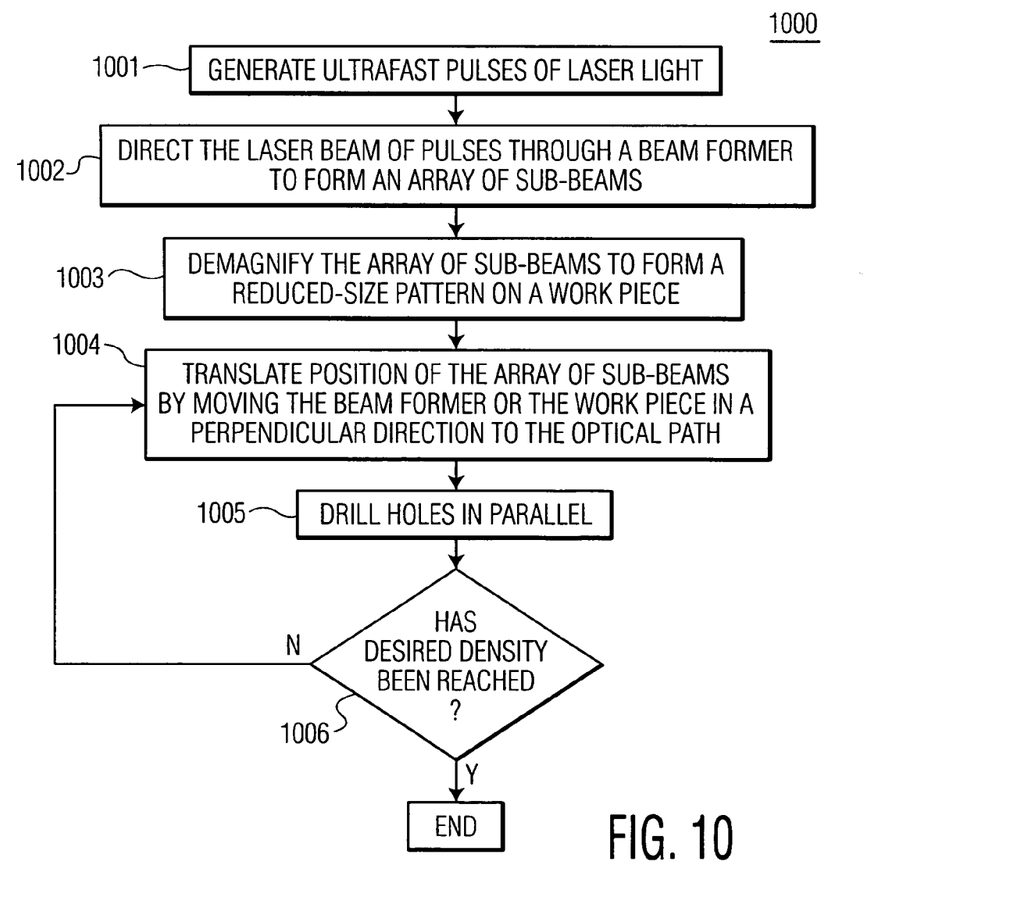
FIG. 10 is a flow diagram of a method of the present invention, in accordance with an embodiment of the invention.

Referring next to FIG. 10 there is shown a method of drilling holes in a work piece, generally designated as 1000. The method includes step 1001, which generates ultrafast pulses of laser light. Step 1002 directs the pulsed laser beam through a beam former to form an array of sub-beams. It will be appreciated that the laser beam former may be either the interpolating image mask 114, shown in FIG. 1, or may be the interpolating phase mask 810, shown in FIG. 8.

In the third step, step 1003, the method demagnifies the array of sub-beams to form a reduced size pattern on the work piece. It will be appreciated that this step may be omitted as there may be a one to one relationship between the array of sub-beams and the pattern of holes on the work piece. Step 1004 translates the position of the array of sub-beams, by moving the beam former or by moving the work piece in a perpendicular direction to the optical path. This movement or translation may be accomplished by using a translation stage that controls the work piece holder or the imaging mask. It will be understood that moving the beam former, when it is an imaging mask, simply requires moving the imaging mask. When the beam former is a phase mask, however, moving the beam former requires moving the telecentric f-θ lens without moving the DOE.

Step 1005 performs the ablation of the work piece, thus drilling holes in parallel on the work piece. The method then enters decision box 1006 and determines whether the desired density of the holes drilled in parallel has been reached. If the desired density has been reached, then the method ends. If the desired density has not been reached, the method branches back to step 1004 and translates the position of the array of sub-beams, by again moving the beam former or the work piece in a perpendicular direction to the optical path. Accordingly, a second run drills holes in parallel on the work piece. This is continued until the desired density is reached.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A laser micromachining system for drilling holes in a work piece comprising:

a laser beam generator for directing a laser beam having a wavelength λ, along an optical path, an image interpolating mask having an array of apertures, disposed in the optical path, for receiving the laser beam and forming a corresponding array of sub-beams of a first pitch size, the array of sub-beams being a sub-pattern of a reduced-size pattern formed on the work piece, a demagnifier, disposed in the optical path, for forming the reduced-size pattern of the array of sub-beams on the work piece, the reduced-size pattern having a second pitch size, and a translation stage coupled to the image interpolating mask for moving the image interpolating mask and the array of sub-beams in a perpendicular direction to the optical path such that the array of sub-beams is moved in a sequence to form the reduced-size pattern on the work piece, wherein the second pitch size is less than λ and the first pitch size is greater than λ, and when the laser beam is generated and the translation stage moves the array of sub-beams, the image interpolating mask is effective in forming an array of holes having the second pitch size.

2. A laser micromachining system for drilling holes in a work piece comprising:

a laser beam generator for directing a laser beam having a wavelength λ, along an optical path, an image interpolating mask having an array of apertures, disposed in the optical path, for receiving the laser beam and forming a corresponding array of sub-beams of a first pitch size, a translation stage configured to move the array of sub-beams in a perpendicular direction to the optical path, and a demagnifier, disposed in the optical path, for forming the reduced-size pattern of the array of sub-beams on the work piece, the reduced-size pattern having a second pitch size, wherein the second pitch size is less than λ and the first pitch size is greater than λ, the array of apertures of the image interpolating mask has an aperture density of 1/N times an image density of the reduced-size pattern on the work piece times a demagnification factor of the demagnifier, N being a positive integer, when the laser beam is generated and the translation stage moves the array of sub-beams, the image interpolating mask is effective in forming an array of holes having the second pitch size, and the array of sub-beams is configured to translate N-times in the perpendicular direction to the optical path by the translation stage to form the array of holes of the second pitch size.

3. The laser micromachining system of claim 1 wherein the laser beam generator includes a pulsed laser providing a pulsed-on period of less than 200 femtoseconds, and a harmonic generating crystal, coupled to the pulsed laser, for providing a harmonic frequency of the pulsed laser to produce the laser beam having the wavelength of λ.

4. The laser micromachining system of claim 1 wherein the demagnifier includes a first lens having a first focal length and a microscope objective having a second focal length, and a demagnification factor resulting from the first focal length divided by the second focal length.

5. A laser micromachining system for drilling holes in a work piece comprising:

a laser beam generator for directing a laser beam having a wavelength λ, along an optical path, an image interpolating mask having an array of apertures, disposed in the optical path, for receiving the laser beam and forming a corresponding array of sub-beams of a first pitch size, each of the sub-beams including a Gaussian intensity distribution, a translation stage configured to move the array of sub-beams in a perpendicular direction to the optical path, and a demagnifier, disposed in the optical path, for forming the reduced-size pattern of the array of sub-beams on the work piece, the reduced-size pattern having a second pitch size, wherein the second pitch size is less than λ and the first pitch size is greater than λ, a hole of the array of holes has a diameter of approximately less than or equal to the full width at half maximum (FWHM) of the Gaussian intensity distribution, and when the laser beam is generated and the translation stage moves the array of sub-beams, the image interpolating mask is effective in forming an array of holes having the second pitch size.

6. The laser micromachining system of claim 1 wherein a scanning mirror is provided in the optical path behind the laser beam generator for uniformly distributing the laser beam onto the image interpolating mask.

7. The laser micromachining system of claim 1 wherein the second pitch size is less than a diffraction limit of the laser beam, and the first pitch size is greater than the diffraction limit of the laser beam multiplied by a demagnification factor of the demagnifier.

8. A laser micromachining system for drilling holes in a work piece comprising:

a laser beam generator for directing a laser beam along an optical path, the laser beam having a wavelength of λ, a diffraction optical element (DOE) and a telecentric f-θ lens disposed in the optical path for receiving the laser beam and forming an array of sub-beams, the array of sub-beams having a first pitch size, a translation stage configured to move the array of sub-beams in a perpendicular direction to the optical path, and a demagnifier for forming a reduced-size pattern of the sub-beams onto the work piece, the reduced-size pattern having a second pitch size, wherein the second pitch size is less than λ and the first pitch size is greater than λ, the array of sub-beams has a density of 1/N times an image density of the reduced-size pattern on the work piece times a demagnification factor of the demagnifier, N being a positive integer, when the laser beam is generated and the translation stage moves the array of sub-beams, the DOE and the telecentric f-θ lens are effective in forming an array of holes having the second pitch size, and the array of sub-beams is configured to translate N-times in a perpendicular direction to the optical path by the translation stage to form the array of holes of the second pitch size.

9. The laser micromachining system of claim 8 wherein the array of sub-beams formed by the DOE and the telecentric f-θ lens are a sub-pattern of the reduced-size pattern formed on the work piece, and the translation stage is configured to move the array of sub-beams in a sequence to form the reduced-size pattern on the work piece.

10. The laser micromachining system of claim 9 wherein the translation stage is coupled to the telecentric f-θ lens for moving the telecentric f-θ lens and the array of sub-beams.

11. The laser micromachining system of claim 9 wherein the translation stage is coupled to a work piece holder holding the work piece for moving the work piece with respect to the array of sub-beams.

12. The laser micromachining system of claim 8 wherein the laser beam generator includes a pulsed laser providing a pulsed-on period of less than 200 femtoseconds, and
a harmonic generating crystal, coupled to the pulsed laser, for providing a harmonic frequency of the pulsed laser to produce the laser beam having the wavelength of λ.

13. A laser micromachining system for drilling holes in a work piece comprising:
a laser beam generator for directing a laser beam along an optical path, the laser beam having a wavelength of λ,
a diffraction optical element (DOE) and a telecentric f-θ lens disposed in the optical path for receiving the laser beam and forming an array of sub-beams, the array of sub-beams having a first pitch size, each of the sub-beams including a Gaussian intensity distribution,
a translation stage configured to move the array of sub-beams in a perpendicular direction to the optical path, and
a demagnifier for forming a reduced-size pattern of the sub-beams onto the work piece, the reduced-size pattern having a second pitch size,
wherein the second pitch size is less than λ and the first pitch size is greater than λ,
a hole of the array of holes has a diameter of approximately less than or equal to the full width at half maximum (FWHM) of the Gaussian intensity distribution, and
when the laser beam is generated and the translation stage moves the array of sub-beams, the DOE and the telecentric f-θ lens are effective in forming an array of holes having the second pitch size.

14. The laser micromachining system of claim 8 wherein a scanning mirror is provided in the optical path behind the laser beam generator for uniformly distributing the laser beam onto the DOE.

15. The laser micromachining system of claim 8 wherein the second pitch size is less than a diffraction limit of the laser beam, and
the first pitch size is greater than the diffraction limit of the laser beam multiplied by a demagnification factor of the demagnifier.

16. A laser micromachining system for drilling holes in a work piece comprising:
a laser beam generator for directing a laser beam having a wavelength λ, along an optical path,
an image interpolating mask having an array of apertures, disposed in the optical path, for receiving the laser beam and forming a corresponding array of sub-beams of a first pitch size,
a translation stage configured to move the array of sub-beams in a perpendicular direction to the optical path, and
a demagnifier, disposed in the optical path, for forming a reduced-size pattern of the array of sub-beams on the work piece, the reduced-size pattern having a second pitch size,
wherein the second pitch size is approximately equal to a Rayleigh distance of 0.61*λ/N.A., where N.A. is a numerical aperture of a lens in the optical path,
the first pitch size is greater than the diffraction limit of the laser beam, and
when the laser beam is generated and the translation stage moves the array of sub-beams, the image interpolating mask is effective in forming an array of holes having the second pitch size.

17. The laser micromachining system of claim 16 wherein the second pitch size is approximately equal to 1.5*Rayleigh distance.

18. A laser micromachining system for drilling holes in a work piece comprising:
a laser beam generator for directing a laser beam along an optical path, the laser beam having a wavelength of λ,
a diffraction optical element (DOE) and a telecentric f-θ lens disposed in the optical path for receiving the laser beam and forming an array of sub-beams, the array of sub-beams having a first pitch size,
a translation stage configured to move the array of sub-beams in a perpendicular direction to the optical path, and
a demagnifier for forming a reduced-size pattern of the sub-beams onto the work piece, the reduced-size pattern having a second pitch size,
wherein the second pitch size is approximately equal to a Rayleigh distance of 0.61*λ/N.A., where N.A. is a numerical aperture of a lens in the optical path,
the first pitch size is greater than the diffraction limit of the laser beam, and
when the laser beam is generated and the translation stage moves the array of sub-beams, the DOE and the telecentric f-θ lens are effective in forming an array of holes having the second pitch size.

19. The laser micromachining system of claim 18 wherein the second pitch size is approximately equal to 1.5*Rayleigh distance.

20. A method of drilling holes in a work piece comprising the steps of:
(a) receiving a laser beam directed along an optical path;
(b) directing the laser beam through a DOE, disposed in the optical path, to form an array of angled sub-beams having an angled beam pattern;
(c) passing the angled beam pattern through a telecentric f-θ lens to form an array of sub-beams in a parallel pattern of a first pitch size;
(d) demagnifying the array of sub-beams to form a reduced-size pattern of a second pitch size on the work piece;
(e) translating the array of sub-beams in a perpendicular direction to the optical path; and
(f) after translating the array of sub-beams in the perpendicular direction to the optical path, forming the reduced-size pattern of the second pitch size on the work piece.

21. The method of claim 20 wherein
step (a) includes receiving the laser beam having a wavelength of λ;
step (c) includes forming the array of sub-beams with a pitch size greater than the wavelength of λ; and
step (f) includes forming the reduced-size pattern on the work piece with a pitch size smaller than the wavelength of λ.

22. The method of claim 20 wherein the first pitch size is larger than the second pitch size by a factor of P times a demagnification factor provided by the demagnifying step, P being a positive integer; and
- step (e) includes translating the array of sub-beams in the perpendicular direction P times; and
- step (f) includes after translating the array of sub-beams P times, forming the reduced-size pattern of the second pitch size on the work piece.

23. The method of claim 20 wherein
- step (e) includes coupling a translation stage to a work piece holder for translating the array of sub-beams in the perpendicular direction with respect to the optical path.

24. A method of drilling holes in a work piece comprising the steps of:
- (a) receiving a laser beam directed along an optical path;
- (b) directing the laser beam through a beam former, disposed in the optical path, to form an array of sub-beams of a first pitch size, the array of sub-beams having a density of 1/N times an image density of a reduced-size pattern to be formed on the work piece times a demagnification factor, N being a positive integer;
- (c) demagnifying the array of sub-beams by the demagnification factor to form the reduced-size pattern of a second pitch size on the work piece;
- (d) translating the array of sub-beams N times in the perpendicular direction to the optical path; and
- (e) after translating the array of sub-beams N times, forming the reduced-size pattern on the work piece.

25. The method of claim 24 wherein
- step (b) includes directing the laser beam through an image interpolating mask having an array of apertures, and
- forming the array of sub-beams after passing the laser beam through the array of apertures.

26. The method of claim 24 wherein
- step (d) includes coupling a translation stage to the beam former for translating the array of sub-beams in the perpendicular direction to the optical path.

* * * * *

UNITED STATES PATENT AND TRADEMARK OFFICE
CERTIFICATE OF CORRECTION

| | |
|---|---|
| PATENT NO. | : 7,880,117 B2 |
| APPLICATION NO. | : 10/812113 |
| DATED | : February 1, 2011 |
| INVENTOR(S) | : Ming Li et al. |

It is certified that error appears in the above-identified patent and that said Letters Patent is hereby corrected as shown below:

The following foreign references were omitted from the face of the above patent:

| | |
|---|---|
| J P 2000-1766669 | 06/2000 |
| JP 362057788A | 03/1987 |
| JP 401289586A | 11/1989 |
| JP 410048529A | 02/1998 |
| JP 411079791A | 03/1999 |

The following non-patent literature documents were also omitted from the face of the above patent.

Ming Li et al., "Nanostructuring In Submicron-Level Waveguides With Femtosecond Laser Pulses" Optics Communications, (2002), pp. 1-5 (Sept. 10, 2002).

Ming Li et al., "Femtosecond Laser Micromachining of Si-on-SiO$_2$ For Photonic Band Gap Crystal Fabrication", Jpn. 1. Appl. Phys. Vol. 40 (2001), pp. 3476-3477, Part 1, No. 5A, May 2001.

Signed and Sealed this
Twelfth Day of April, 2011

David J. Kappos
*Director of the United States Patent and Trademark Office*